(12) United States Patent
Murray et al.

(10) Patent No.: US 10,572,935 B1
(45) Date of Patent: Feb. 25, 2020

(54) DISAMBIGUATION OF ENTITIES BASED ON FINANCIAL INTERACTIONS

(71) Applicant: INTUIT INC., Mountain View, CA (US)

(72) Inventors: Calum G. Murray, Santa Rosa, CA (US); Jeffrey A. Langston, Palo Alto, CA (US); John J. Tumminaro, Palo Alto, CA (US)

(73) Assignee: INTUIT, INC., Mountain View, CA (US)

( * ) Notice: Subject to any disclaimer, the term of this patent is extended or adjusted under 35 U.S.C. 154(b) by 836 days.

(21) Appl. No.: 14/333,048

(22) Filed: Jul. 16, 2014

(51) Int. Cl.
*G06Q 40/00* (2012.01)

(52) U.S. Cl.
CPC .................................... *G06Q 40/00* (2013.01)

(58) Field of Classification Search
None
See application file for complete search history.

(56) References Cited

U.S. PATENT DOCUMENTS

| | | | | |
|---|---|---|---|---|
| 7,672,833 B2* | 3/2010 | Blume | ................... | G06F 17/278 704/10 |
| 7,912,842 B1* | 3/2011 | Bayliss | ............... | G06F 16/2471 707/749 |
| 8,166,013 B2* | 4/2012 | Bandaru | ............. | G06F 17/2745 707/705 |
| 8,166,168 B2* | 4/2012 | Hayashi | ................. | G06Q 10/10 709/223 |
| 8,452,772 B1* | 5/2013 | Carpio | .............. | G06F 17/30864 707/737 |
| 8,874,616 B1* | 10/2014 | Coffman | ................ | G06Q 50/01 707/798 |
| 8,965,848 B2* | 2/2015 | Caceres | ................ | G06F 16/215 707/626 |
| 8,972,408 B1* | 3/2015 | Carpio | .............. | G06F 17/30864 707/737 |
| 2002/0075844 A1* | 6/2002 | Hagen | ................. | H04L 63/0442 370/351 |
| 2003/0195836 A1* | 10/2003 | Hayes | ................. | G06Q 20/102 705/37 |
| 2005/0216395 A1* | 9/2005 | Behmoiras | ......... | G06Q 10/0639 705/38 |
| 2006/0106847 A1* | 5/2006 | Eckardt, III | ...... | G06F 17/30696 |
| 2007/0060173 A1* | 3/2007 | Ramer | ................... | G06Q 30/02 455/456.3 |

(Continued)

*Primary Examiner* — Christopher Bridges
(74) *Attorney, Agent, or Firm* — Patterson + Sheridan, LLP

(57) ABSTRACT

During an analysis technique, information associated with two entities may be compared to determine a similarity metric. For example, a string distance between the information may be computed. Then, an association metric between financial-transaction histories for the two entities may be calculated. This calculation may involve comparing the nodes and branches in a commerce graph that represents financial interrelationships among a set of entities, including inputs received by the set of entities, outputs provided by the set of entities, and financial transactions among the set of entities. Next, a determination of whether the entities are likely to be a same entity may be based on the similarity metric and/or the association metric. If the entities are likely to be the same entity, the entities may be combined in a data structure. Alternatively, if the entities are not likely to be the same, they may remain separate.

20 Claims, 5 Drawing Sheets

(56) References Cited

U.S. PATENT DOCUMENTS

| | | | | |
|---|---|---|---|---|
| 2007/0061333 | A1* | 3/2007 | Ramer | G06F 17/30867 |
| 2007/0067285 | A1* | 3/2007 | Blume | G06Q 10/10 |
| 2008/0214204 | A1* | 9/2008 | Ramer | G01C 3/24 |
| | | | | 455/456.1 |
| 2009/0157593 | A1* | 6/2009 | Hayashi | G06Q 10/10 |
| 2009/0248694 | A1* | 10/2009 | Martinez | G06F 17/30404 |
| 2009/0248738 | A1* | 10/2009 | Martinez | G06F 17/30292 |
| 2009/0292595 | A1* | 11/2009 | Tonnison | G06Q 30/02 |
| | | | | 705/14.1 |
| 2010/0027527 | A1* | 2/2010 | Higgins | H04W 4/18 |
| | | | | 370/351 |
| 2010/0125562 | A1* | 5/2010 | Nair | G06F 17/3089 |
| | | | | 707/709 |
| 2010/0125563 | A1* | 5/2010 | Nair | G06Q 30/02 |
| | | | | 707/709 |
| 2010/0125569 | A1* | 5/2010 | Nair | G06F 17/30864 |
| | | | | 707/722 |
| 2010/0125604 | A1* | 5/2010 | Martinez | G06F 17/30867 |
| | | | | 707/784 |
| 2010/0125605 | A1* | 5/2010 | Nair | G06F 17/30867 |
| | | | | 707/784 |
| 2010/0153211 | A1* | 6/2010 | Ramer | G06Q 10/10 |
| | | | | 705/14.52 |
| 2011/0123011 | A1* | 5/2011 | Manley | G06Q 30/02 |
| | | | | 379/201.02 |
| 2011/0167060 | A1* | 7/2011 | Merz | G06F 17/30495 |
| | | | | 707/727 |
| 2012/0278831 | A1* | 11/2012 | van Coppenolle | |
| | | | | H04L 65/4084 |
| | | | | 725/25 |
| 2013/0060620 | A1* | 3/2013 | Davis | G06Q 30/0185 |
| | | | | 705/14.23 |
| 2013/0060624 | A1* | 3/2013 | Davis | G06Q 30/02 |
| | | | | 705/14.36 |
| 2013/0060625 | A1* | 3/2013 | Davis | G06Q 30/02 |
| | | | | 705/14.36 |
| 2013/0060852 | A1* | 3/2013 | Davis | G06Q 20/32 |
| | | | | 709/204 |
| 2013/0061333 | A1* | 3/2013 | Davis | H04L 63/0861 |
| | | | | 726/28 |
| 2013/0268756 | A1* | 10/2013 | Davis | G06F 21/6218 |
| | | | | 713/165 |
| 2013/0268773 | A1* | 10/2013 | Davis | G06F 21/602 |
| | | | | 713/189 |
| 2013/0275164 | A1* | 10/2013 | Gruber | G10L 17/22 |
| | | | | 705/5 |
| 2013/0287204 | A1* | 10/2013 | Davis | H04L 9/28 |
| | | | | 380/28 |
| 2013/0290700 | A1* | 10/2013 | Davis | H04L 63/0428 |
| | | | | 713/153 |
| 2013/0308767 | A1* | 11/2013 | Manley | G06Q 30/02 |
| | | | | 379/142.09 |
| 2013/0311467 | A1* | 11/2013 | Galle | G06F 17/2795 |
| | | | | 707/737 |
| 2013/0325881 | A1* | 12/2013 | Deshpande | G06F 17/30292 |
| | | | | 707/755 |
| 2014/0180826 | A1* | 6/2014 | Boal | G06Q 30/0245 |
| | | | | 705/14.66 |
| 2014/0278754 | A1* | 9/2014 | Cronin | G06F 17/30539 |
| | | | | 705/7.29 |
| 2014/0279299 | A1* | 9/2014 | Erenrich | G06Q 40/10 |
| | | | | 705/30 |
| 2014/0280314 | A1* | 9/2014 | Coleman | G06F 17/30587 |
| | | | | 707/769 |
| 2014/0282586 | A1* | 9/2014 | Shear | G06F 9/5072 |
| | | | | 718/104 |
| 2014/0365347 | A1* | 12/2014 | Murray | G06Q 40/12 |
| | | | | 705/30 |
| 2015/0154198 | A1* | 6/2015 | Lightner | G06F 17/3053 |
| | | | | 707/802 |
| 2015/0154268 | A1* | 6/2015 | Lightner | G06F 17/30542 |
| | | | | 707/723 |
| 2015/0154286 | A1* | 6/2015 | Lightner | G06F 19/24 |
| | | | | 707/728 |

* cited by examiner

DISAMBIGUATION OF ENTITIES BASED ON FINANCIAL INTERACTIONS

CROSS-REFERENCE TO RELATED APPLICATION

This application is related to U.S. Non-Provisional application Ser. No. 14/198,364, entitled "Performing Commerce Queries Using a Commerce Graph," by George Roumeliotis, Brian Wilt, and Heather Wasserlein, filed on Mar. 5, 2014.

BACKGROUND

The present disclosure relates to a technique for disambiguating information associated with multiple entities based on financial interactions among a set of entities. More specifically, the present disclosure relates to a technique for determining that two entities (such as businesses) are a common entity.

Data is increasingly viewed as a valuable business asset. For example, data associated with financial transaction histories of entities (such as individuals, businesses and/or organizations) can, in principle, be leveraged to provide improved services, such as targeted advertising and promotions that are provided to the entities or individuals associated with the entities.

However, in practice these efforts can be hampered by the complexities of the data. In particular, the financial transaction histories may be associated with multiple accounts for different applications. While differences in the account information may make it appear as if these accounts are associated with different entities, they may in fact be associated with a common entity. For example, there may be spelling errors in the account information and/or the accounts may have been established at different times and the account information may have changed.

The presence of such redundant entities in the data may make it difficult to leverage the financial transaction histories. Notably, differences in the account information for seemingly different entities (which are in fact associated with a common entity) may hamper attempts to determine statistical associations in the data and, thus, may interfere with efforts to provide services based on the financial transaction histories. For example, the different entities may have different addresses, which may make it difficult to accurately target advertisements to the common entity. Moreover, the presence of redundant and/or erroneous data in the financial transaction histories may reduce the relevancy or usefulness of targeted advertisements and/or services that are provided to the entities.

SUMMARY

The disclosed embodiments relate to a computer system that disambiguates two entities. During operation, the computer system accesses information specifying the two entities. Then, the computer system compares the information to determine a similarity metric. Moreover, the computer system calculates an association metric between financial-transaction histories for the two entities based on analysis of entries in a data structure that includes historical financial data for the two entities. This data structure represents the historical financial data as a commerce graph with nodes and branches representing financial interrelationships among a set of entities. Furthermore, the financial interrelationships include inputs received by the set of entities, outputs provided by the set of entities, and financial transactions among the set of entities. Next, the computer system determines whether the two entities are likely to be a same entity based on the similarity metric and the association metric.

In some embodiments, the comparing operation involves computing a string distance of the information for the two entities. Additionally, the calculating operation may involve comparing the branches from nodes associated with the two entities, where the association metric indicates a stronger association between the entities if patterns of the branches are similar for the nodes.

Note that the branches may have different weights in the calculation. Moreover, the financial transactions may include: payments, invoices, estimates and/or messages among the set of entities, where the weights for payments are larger than the weights for the invoices, the weights for the invoices are larger than the weights for the estimates, and the weights for the estimates are larger than the weights for the messages.

Furthermore, the entities may include individuals, businesses and/or organizations.

In some embodiments, the computer system requests feedback from at least one of the two entities regarding whether the two entities are the same entity if the two entities are likely to be the same entity. Then, the computer system receives the feedback. If the feedback indicates that the two entities are the same entity, the computer system combines the two entities into the same entity. Otherwise, the computer system keeps the two entities separate.

Additionally, the financial transactions may have been conducted using financial vehicles associated with different financial institutions.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
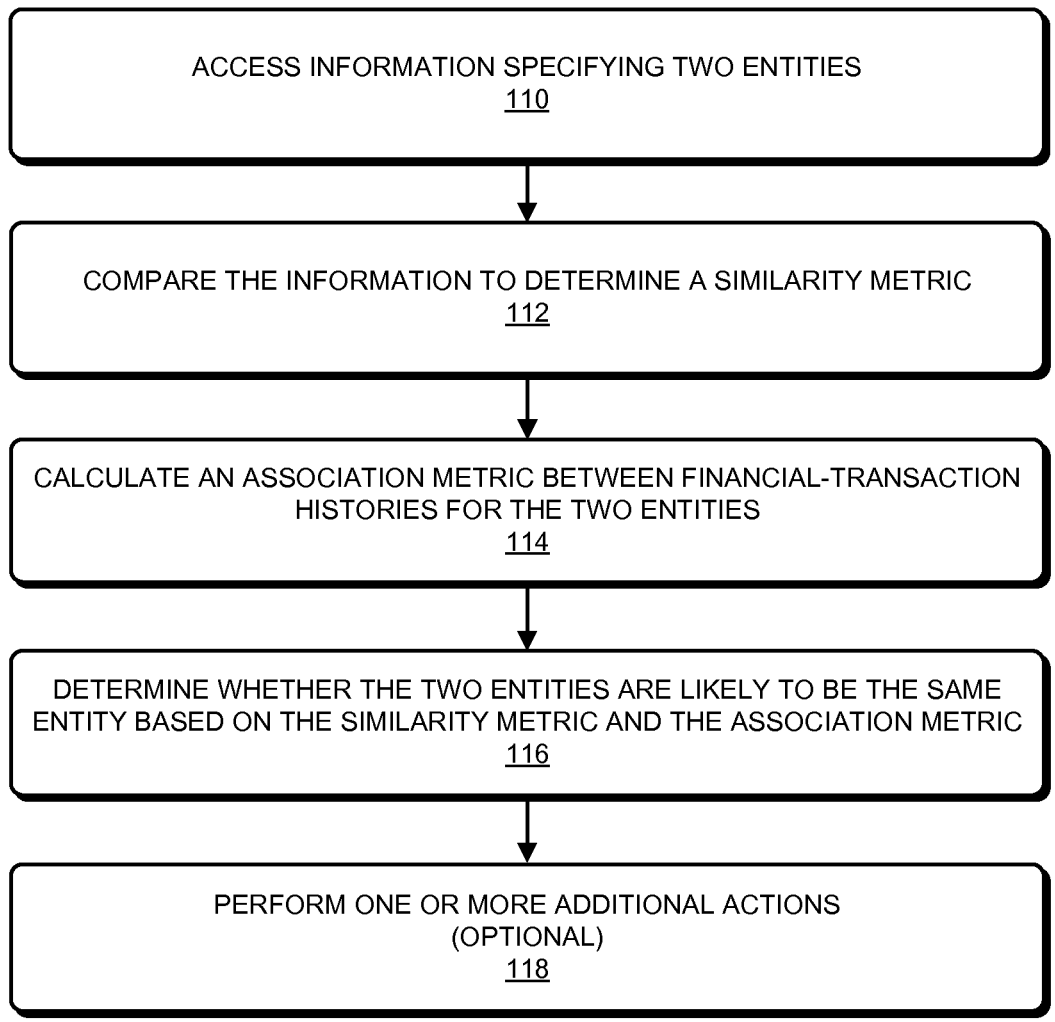
FIG. 1 is a flow chart illustrating a method for disambiguating two entities in accordance with an embodiment of the present disclosure.

Embodiments of a computer system, a technique for disambiguating entities, and a computer-program product (e.g., software) for use with the computer system are described. During this analysis technique, information specifying the entities (such as individuals, organizations and/or businesses) may be compared to determine a similarity metric. For example, a string distance between the information may be computed. More generally, the similarity metric may represents the result of a comparison of the information specifying the entities (such as a comparison of characters representing the names of the entities, addresses of the entities, identifiers of the entities, etc.). Then, an association metric between financial-transaction histories for the two entities may be calculated. This calculation may involve comparing the nodes and branches in a commerce graph that represents financial interrelationships among a set of entities, including inputs received by the set of entities, outputs provided by the set of entities, and financial transactions among the set of entities. In particular, the commerce graph may be based on historical financial data for the set of entities, including: payments, invoices, estimates, messages among the set of entities, business volume (or sales), customer loyalty, business location, etc. Next, whether the entities are likely to be a same entity may be determined based on the similarity metric and/or the association metric. If the entities are likely to be the same entity, the entities may be combined in a data structure. Alternatively, if the entities are not likely to be the same, they may remain separate in the data structure.

By using the financial-relationship information to disambiguate the entities and merging them together if they represent the same entity, the analysis technique improves the commerce graph, which may allow it to be leveraged more effectively. In particular, the interrelationships among the set of entities (which are represented by the commerce graph) may specify a relationship between the user and potential customers or potential suppliers. The analysis technique set forth above may improve the accuracy of the commerce graph, thereby allowing improved services to be provided to the entities. For example, interests of an entity and relevant entities they interact with may be specified by their previous purchasing decisions (and, more generally, their financial transactions). This may allow more relevant results to be determined for the entity, even when performing searches involving small sets of entities (i.e., the types of searches where the behavior of a larger number of entities cannot be used, and thus where traditional search engines have difficulty in obtaining accurate results). Alternatively, the entities may be accurately classified into different categories, which may be used by financial institutions. Therefore, by enabling improved services, the analysis technique may increase customer satisfaction and, thus, may increase the revenue of a provider of the analysis technique.

In the discussion that follows, an entity may include: an individual or a person (for example, an existing customer, a new customer, a service provider, a vendor, a contractor, etc.), an organization, a business, a government agency and, more generally, a group of one or more individuals who are associated formally or informally. Furthermore, a 'business' should be understood to include: for-profit corporations, non-profit corporations, organizations, groups of individuals, sole proprietorships, government agencies, partnerships and, more generally, an organization (which includes one or more individuals) that exchanges goods and/or services with other individuals or organizations.

Note that the commerce graph may represent the interrelationships (and, in particular, the financial interrelationships) among a set of entities (such as individuals, organizations, businesses, companies, commercial entities, etc.). These entities may have financial interactions or transactions in a business 'ecosystem.' Note that such an ecosystem may range from a local region to a country (or the world), or may include an industry. In some embodiments, the ecosystem encompasses the financial transactions that occur among a set of entities that utilize a group of financial applications provided by one or more providers, such as: income-tax software, accounting software, payroll software, online banking, mobile-payment applications, etc. Moreover, the group of financial applications may be executed on a variety of platforms, such as: portable electronic devices, desktop computers, etc. As such, the financial transactions may be performed or conducted using financial instruments provided by multiple different financial institutions. For example, individuals in the ecosystem may purchase goods and services from one another using different types of credit cards, debit cards and/or checks that are supported by different banks, at least some of which are outside of each other's financial networks or financial-management systems.

Therefore, the commerce graph may include information about financial interrelationships that is more comprehensive than that available within a given financial network (such as a credit-card network) supported by a particular group of financial institutions (stated differently, the commerce graph may integrate previously siloed information from different financial networks or financial-management systems). This '360° financial perspective' in the commerce graph may provide more complete and accurate information about the financial interrelationships and transactions among the set of entities. Furthermore, this capability may facilitate more accurate results in response to commerce queries (such as searches for information pertinent to potential future financial transactions), which in turn may allow users to conduct desired financial transactions and to obtain more favorable outcomes (e.g., it may improve consumer satisfaction with the financial transactions).

In addition, the financial interrelationships embodied in the commerce graph may allow multiple financial accounts of an individual (and, more generally, entities) to be identified. For example, because of data-entry errors (such as typographic errors), there may be differences in the personal or user information of an individual in two different financial accounts (one for income-tax software and the other for accounting software). The wealth of information in the commerce graph may be used to determine that these two financial accounts correspond to the same individual. Thus, the commerce graph may cluster information (such as user information: an individual's name, address, phone number, web-page uniform resource locator, etc.) to account for manual-entry errors. More generally, business interrelationships (such as financial accounts, vendor and customer lists, user information, companies, payers, payees, etc.) in historical financial data (such as financial transactions conducted by the set of entities using the group of financial applications in an ecosystem) may be clustered to specify the commerce graph. Note that the financial interrelationships in the commerce graph may include generalized relationships, including: financial transactions, chargebacks, denials, returns, invoices, estimates, contacts in a social network (e.g., professional relationships among individuals), business deals, etc.

We now describe embodiments of the analysis technique. FIG. 1 presents a flow chart illustrating a method 100 for disambiguating two (or more) entities, which may be performed by a computer system (such as computer system 500 in FIG. 5). During operation, the computer system accesses information specifying the two entities (operation 110), such as individuals, groups of individuals, companies or businesses, and/or organizations. For example, the computer system may access the information in a data structure stored in a computer-readable memory.

Then, the computer system compares the information to determine a similarity metric (operation 112). The comparing via the similarity metric may involve computing a string distance of the identifying information for the two entities. More generally, the similarity-metric comparing may involve determining a generalized distance between the alphanumeric characters in the information for the two entities, such as: names of the two entities, addresses of the two entities, identifiers of the two entities (such as Employer Identification Numbers), metadata associated with the two entities (such as a type of business), etc.

Moreover, the computer system calculates an association metric between financial-transaction histories for the two entities (operation 114) based on analysis of entries in a data structure stored in a computer-readable memory that includes historical financial data for the two entities. (In some embodiments, the association metric is only calculated if the similarity metric is less than a threshold value, such as 0.1, which indicates that the information for the two entities is very similar.) More generally, the association metric may represent the similarity between the counterparties that interact with, communicate with or have conducted financial transactions with the two entities. Note that the data structure may represent the historical financial data as a commerce graph with nodes and branches representing financial interrelationships among a set of entities. Furthermore, the financial interrelationships include inputs received by the set of entities (such as messages, emails, estimates, invoices, person-to-person payments, payments, collaborations, etc.), outputs provided by the set of entities (such as messages, emails, estimates, invoices, person-to-person payments, payments, collaborations, etc.), and financial transactions among the set of entities (such as a purchase of a product or a service). Moreover, the historical financial data may include financial information about one or more entities (such as an individual or a group of individuals) that was obtained from multiple different sources (such as different banks, different financial institutions, separate providers of different debit or credit cards, etc.). For example, the financial transactions in the historical financial data may have been conducted using financial vehicles (such as credit or debit cards) associated with different financial institutions (such as banks).

For example, the calculating (operation 114) may involve comparing the branches from nodes associated with the two entities, where the association metric indicates a stronger association between the entities if patterns of the branches are similar for the nodes. In some embodiments, the branches have different weights in the calculation based on how likely a given financial transaction or message (which may be represented by a branch in the commerce graph) indicates the financial interrelationship or interaction between different entities. For example, the financial transactions may include payments, invoices, estimates and/or messages among the set of entities, and the weights for payments may be larger than the weights for the invoices, the weights for the invoices may be larger than the weights for the estimates, and the weights for the estimates may be larger than the weights for the messages. This may be because the invoices provide a better metric for financial interrelationship or interaction than the estimates, which in turn provide a better metric for financial interrelationship or interaction than the messages. Thus, a payment may have a weight of 1, an invoice may have a weight of 0.6, an estimate may have a weight of 0.3 and a message may have a weight of 0.1.

As an illustration, the association metric may be calculated by traversing the commerce graph in proximity to the nodes representing the two entities. The association metric may be calculated for these nodes as a weighted summation of the number of branches from the nodes representing the two entities that are coupled to common nodes (i.e., nodes that are coupled to both of the nodes representing the two entities) of another entity. As noted previously, the weights for the different types of branches may be different, thereby allowing certain types of financial interactions or interrelationships to have a larger impact on the association metric than others. Note that the association metric may be calculated by traversing the commerce graph using dynamic programming.

Next, the computer system determines whether the two entities are likely to be a same entity based on the similarity metric and the association metric (operation 116). For example, the similarity metric and the association metric may each be normalized (e.g., using maximum values) and compared to threshold values (such as less than 0.1 for the similarity metric and greater than 0.8 for the association metric). If both of these comparison criteria are met, the computer system may determine that the two entities are likely to be the same entity. However, in some embodiments the computer system determines that the two entities are likely to be the same entity if either of the comparison criteria are met.

In some embodiments, the computer system performs one or more optional additional actions (operation 118). For example, the computer system may request feedback from at least one of the two entities regarding whether the two entities are the same entity if the two entities are likely to be the same entity. (Thus, an email or another message may be sent to an individual with a request that the individual clarify whether two different entities both actually represent the individual.) Then, the computer system may receive the feedback. (For example, the individual may click on a link on an email message to indicate that the two entities both represent the individual.) If the feedback indicates that the two entities are the same entity, the computer system may combine the two entities into the same entity. Otherwise, the computer system may keep the two entities separate.

Figure 2:
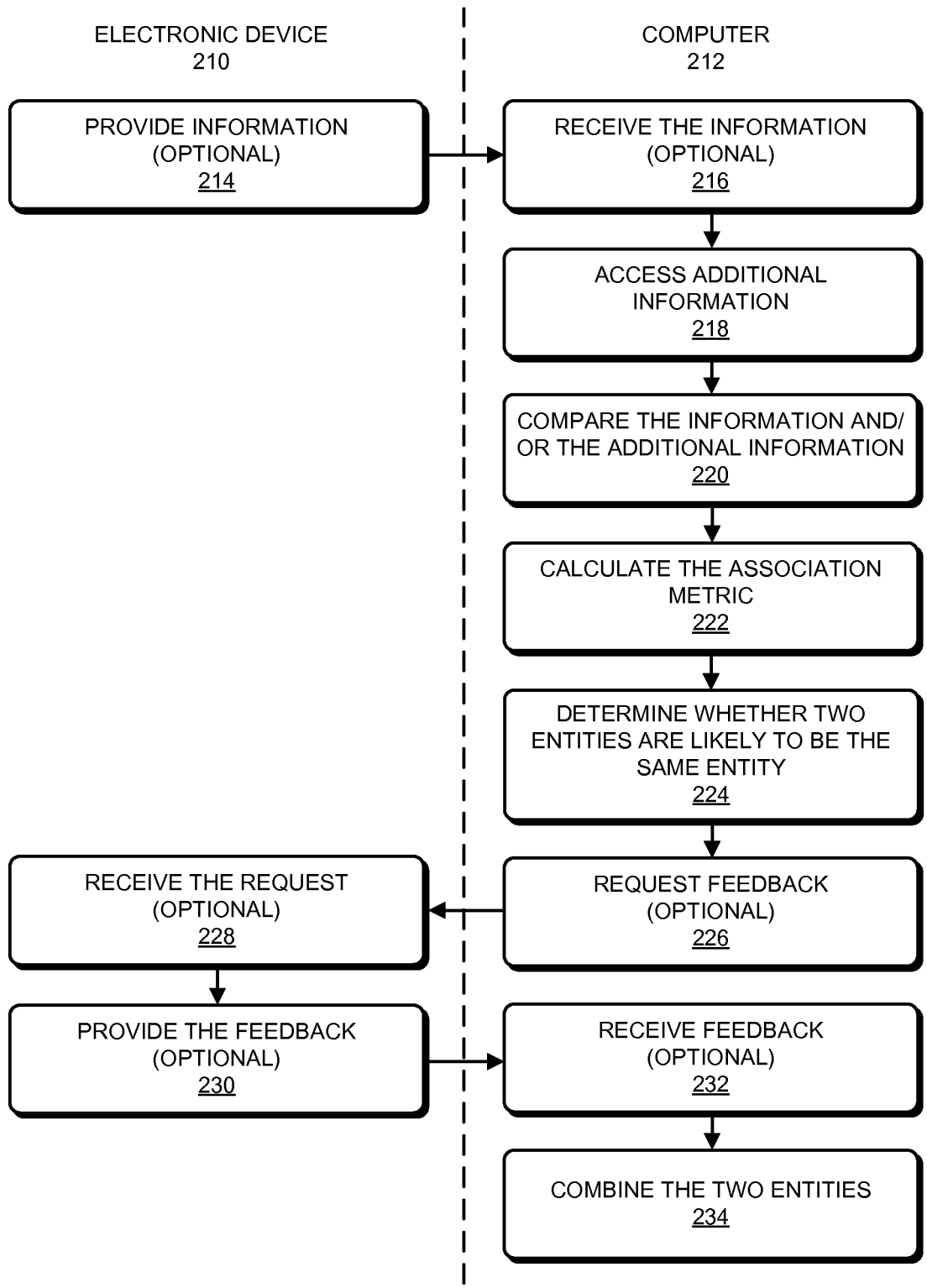
FIG. 2 is a flow chart illustrating the method of FIG. 1 in accordance with an embodiment of the present disclosure.

In an exemplary embodiment, the analysis technique is implemented using an electronic device (such as a computer or a portable electronic device, e.g., a cellular telephone, a personal computer, a laptop computer, a tablet computer and, more generally, an electronic device capable of manipulating computer-readable data or communicating such data between two or more computing systems over a network) and a computer, which communicate through a network, such as a cellular-telephone network, a wireless network, the Internet, an intranet, LAN, WAN, MAN, and/or a combination of these networks or other technology enabling communication between computing systems (e.g., using a client-server architecture). (More generally, the communication between the electronic device and the computer may not require the existence of a network. Instead, an adhoc network or direct communication may be used.) This is illustrated in FIG. 2, which presents a flow chart illustrating method 100 (FIG. 1).

During the method, electronic device 210 optionally provides (operation 214) and computer 212 optionally receives (operation 216) information specifying at least one of the two entities. For example, the user of electronic device

210 may optionally provide (operation 214) information specifying an entity, such as an account associated with a software application. In addition, computer 212 may access additional information (operation 218) specifying another entity, such as information in a data structure that specifies multiple entities.

Then, computer 212 may compare the information and/or the additional information (operation 220) specifying the two entities to calculate the similarity metric. Moreover, computer 212 may calculate the association metric (operation 222) between financial-transaction histories for the two entities based on analysis of entries in the historical financial data for the two entities. Note that operation 222 may involve accessing the financial-transaction histories for the two entities in the data structure and/or another data structure.

Next, computer 212 may determine whether the two entities are likely to be a same entity (operation 224) based on the similarity metric and the association metric.

Furthermore, computer 212 may perform optional additional actions, such as optionally requesting feedback (operation 226) from electronic device 210. After receiving the request (operation 228), the user may optionally provide the feedback (operation 230). Computer 212 may optionally receive the feedback (operation 232) and, if the feedback indicates that the two entities are the same entity, may optionally combine the two entities (operation 234) into the same entity.

In some embodiments of method 100 (FIGS. 1 and 2), there may be additional or fewer operations. For example, the disambiguating of the information specifying the two entities may be based on topological analysis of at least portions of the commerce graph. This may involve looking at the topological similarity of the nodes that are coupled to the nodes representing the two entities (such as by comparing simplicial complexes representing the environments in the commerce graphs proximate to the nodes representing the two entities, analyzing these simplicial complexes using the theory of persistent homology, etc.). Alternatively or additionally, the computer system may combine the two entities based on whether the determined likelihood indicates that the two entities are the same (i.e., without the user feedback). Moreover, the order of the operations may be changed, and/or two or more operations may be combined into a single operation.

In an exemplary embodiment, the analysis technique disambiguates two entities. For example, one entity may be named 'Smith, Inc.,' while the other is named 'Smyth, Inc.' In particular, accounts for these two entities may have been initially set up two years apart using different software applications, such as an income-tax application and an accounting application. Consequently, addresses and phone numbers (and, more generally, contact information) associated with the two entities may be different.

However, because the string distance (such as the Levenshtein distance) between the names or the information specifying the two entities is similar (the difference is one character), the association metric may be computed. The association metric may be calculated based on historical financial data for the two entities. For example, the historical financial data may be represented using a commerce graph. The nodes in the commerce graph for the two entities may have a common set of branches, i.e., the nodes may have financial interactions (such as previous financial transactions) with a common set of individuals and/or companies. In addition, the branches may indicate the same types of financial interactions (invoices, estimates, etc.) and/or financial interactions having the same values.

The combination of the similarity metric and the association metric (which is sometimes referred to as a 'confidence score') may indicate that it is likely that the two entities are the same entity (and, thus, that the difference in the names is a typographic error). For example, a combination of the similarity metric and the association metric (with optional weights) may be used to determine a likelihood value, such as a number between 0 and 1. If the likelihood value exceeds a threshold (such as 0.8), the two entities are likely to be the same entity. In the present example, the similarity metric and the association metric may both be close to 1, so the two entities can be combined or merged.

In some embodiments, a disambiguation engine walks or analyzes the commerce graph to compare groups of nodes (with two or more nodes per group). Then, a rules engine may provide rules and (as described further below) weights for use in the disambiguation, such as different weights for different branches in the commerce graph (which may represent different types of interactions). Moreover, the sameness or the association metric of two nodes may be determined based on the sameness of the graph around nodes, such as the financial interactions (or branches) and relative weights of the branches. In conjunction with the similarity metric (which may provide an indication of the sameness of the two entities based on an exact or a fuzzy match using string distance), this information about the associations or financial interactions associated with the nodes can be used to disambiguate two or more nodes or entities. Note that the association metric may include an examination of the financial relationships (who the counterparties are) and/or the types of interactions. The different types of interactions may be weighted based on the likelihood that they indicate the two entities are the same. Thus, a payment may have a higher weight than an invoice, which may have a higher weight than a chat message. In general, the sameness of the two entities may be determined based on: the similarity metric, the association metric based on the counterparties in financial interactions, and/or the association metric based on the types and/or values of the financial interactions.

While the preceding example illustrated the analysis technique using two entities that have similar names, the information specifying the two entities that is compared may be other than names, such as: addresses, phone numbers, identifiers, types of business, metadata, information in annual corporate filings, etc. Furthermore, in some embodiments the analysis technique is used to disambiguate two entities that have very different information (such as different names). For example, Smith, Inc. may operate for 10 years. Then, their name may be changed to Jerome's Gelatos and Ices, Inc. Even though these two names may have a very poor similarity metric, they may have common financial-transaction histories. Consequently, even if the two entities have different subscriptions to financial software (such as accounting software), with different user identifiers and registration information), the association metric calculated based on the financial-transaction histories for these entities (which may be compiled by the financial software) may be almost identical. In this case, the analysis technique may conclude that the two entities are likely to be the same even though the similarity metric (such as the string distance) is enormous. In this case, this may be because the association metric for these two entities indicates that their financial interactions are very similar. In particular, because the two entities conduct business in the same way (with the same suppliers and/or customers), this may be reflected by the pattern of nodes and edges in the commerce graph and, thus, in the association metric.

Similarly, in some embodiments the analysis technique is used to disambiguate two entities that have very similar information but an association metric that suggests that they have very different financial interactions. For example, there may be two companies that have almost the same name. However, after 10 years of operation, the company may have divested or exited one of its businesses (such as in a particular market segment). Consequently, while the information for the two companies (and, thus, the similarity metric) may have a high or large value, the association metric may have a low or a small value. Nonetheless, based on the similarity metric, the analysis technique may disambiguate these two entities.

Figure 3:
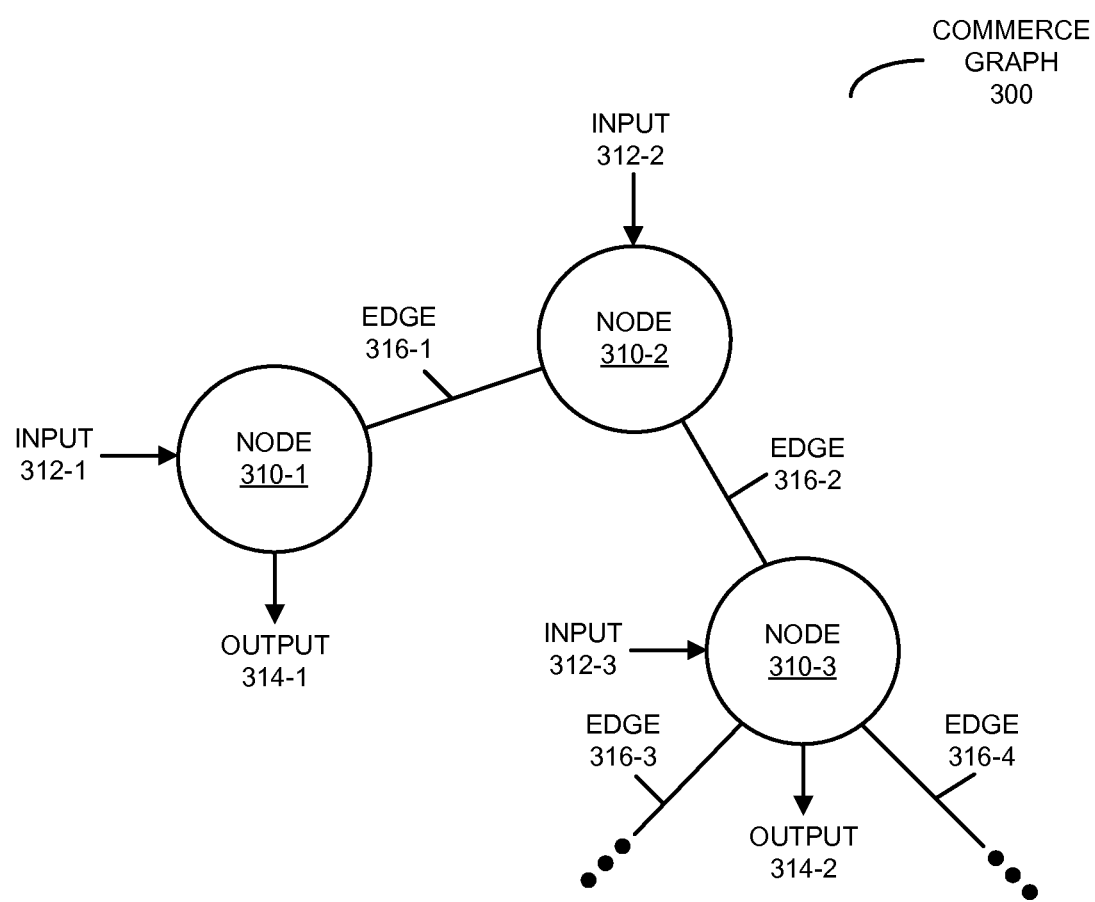
FIG. 3 is a drawing illustrating a commerce graph in accordance with an embodiment of the present disclosure.

We now further describe the commerce graph. FIG. 3 presents a drawing illustrating commerce graph 300. This commerce graph has inputs 312 to and outputs 314 from nodes 310 (such as those corresponding to entities), as well as interactions, flows or edges 316 (such as financial transactions) among nodes 310. Note that some outputs from nodes 310 may be included in edges 316. Moreover, the financial interrelationships embodied in commerce graph 300 may allow the set of entities to be ranked based on factors, such as: customer loyalty, business revenue or sales, geographic location (e.g., based on supply/spending patterns), etc. This information in commerce graph 300 may be used to disambiguate information specifying two or more entities.

In some embodiments, the analysis technique may be offered as a service to other companies, such as a financial institution. For example, a bank may interact with commerce graph 300 (e.g., via an application programming interface) to leverage the information embodied in commerce graph 300 to disambiguate information specifying two or more entities.

Figure 4:
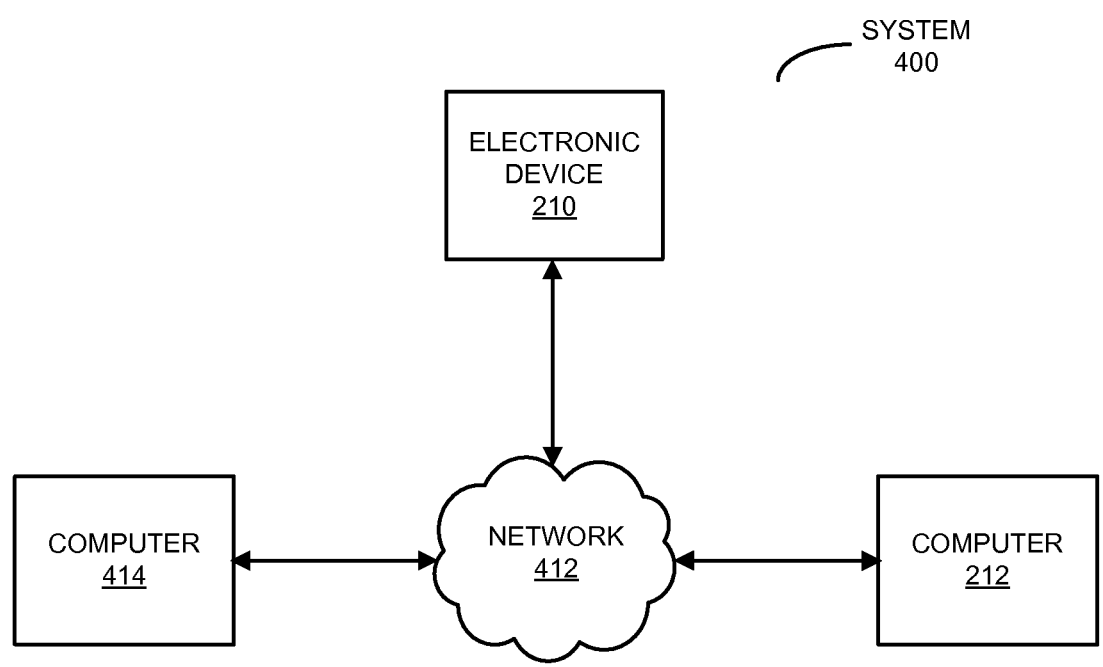
FIG. 4 is a block diagram illustrating a system that performs the method of FIGS. 1 and 2 in accordance with an embodiment of the present disclosure.

We now describe embodiments of a system and the computer system, and their use. FIG. 4 presents a block diagram illustrating a system 400 that can be used, in part, to perform operations in method 100 (FIGS. 1 and 2). In this system, during the analysis technique a user of electronic device 210 may use a software product, such as a software application that is resident on and that executes on electronic device 210. (Alternatively, the user may interact with a web page that is provided by computer 212 via network 412, and which is rendered by a web browser on electronic device 210. For example, at least a portion of the software application may be an application tool that is embedded in the web page, and which executes in a virtual environment of the web browser. Thus, the application tool may be provided to the user via a client-server architecture.) This software application may be a standalone application or a portion of another application that is resident on and which executes on electronic device 210 (such as a software application that is provided by computer 212 or that is installed and which executes on electronic device 210).

During the analysis technique, the user of the software application may provide, via network 412, information specifying at least one of the two entities to computer 212. For example, the user of electronic device 210 may set up a new account associated with the software application. Alternatively or additionally, computer 212 may access additional information specifying another entity, such as information in a data structure that specifies multiple entities. Note that the additional information may be stored locally or remotely from computer 212, such as on computer 414 (which is accessed via network 412).

Then, computer 212 may compare the information specifying the two entities to determine the similarity metric. Moreover, computer 212 may calculate the association metric between financial-transaction histories for the two entities based on analysis of entries in the historical financial data for the two entities. Note that the historical financial data may also be stored locally or remotely from computer 212, such as on computer 414 (which is accessed via network 412).

Next, computer 212 may determine whether the two entities are likely to be a same entity based on the similarity metric and the association metric.

Furthermore, computer 212 may perform optional additional actions. For example, via network 412, computer 212 may request feedback from the user of electronic device 210. The user may respond, via network 412, with the requested feedback. In response, computer 212 may combine the two entities into the same entity if the feedback indicates that the two entities are the same entity.

Note that the data stored in system 400 may be sensitive in nature. Consequently, it may be encrypted. For example, stored data and/or data communicated via network 412 may be encrypted.

Figure 5:
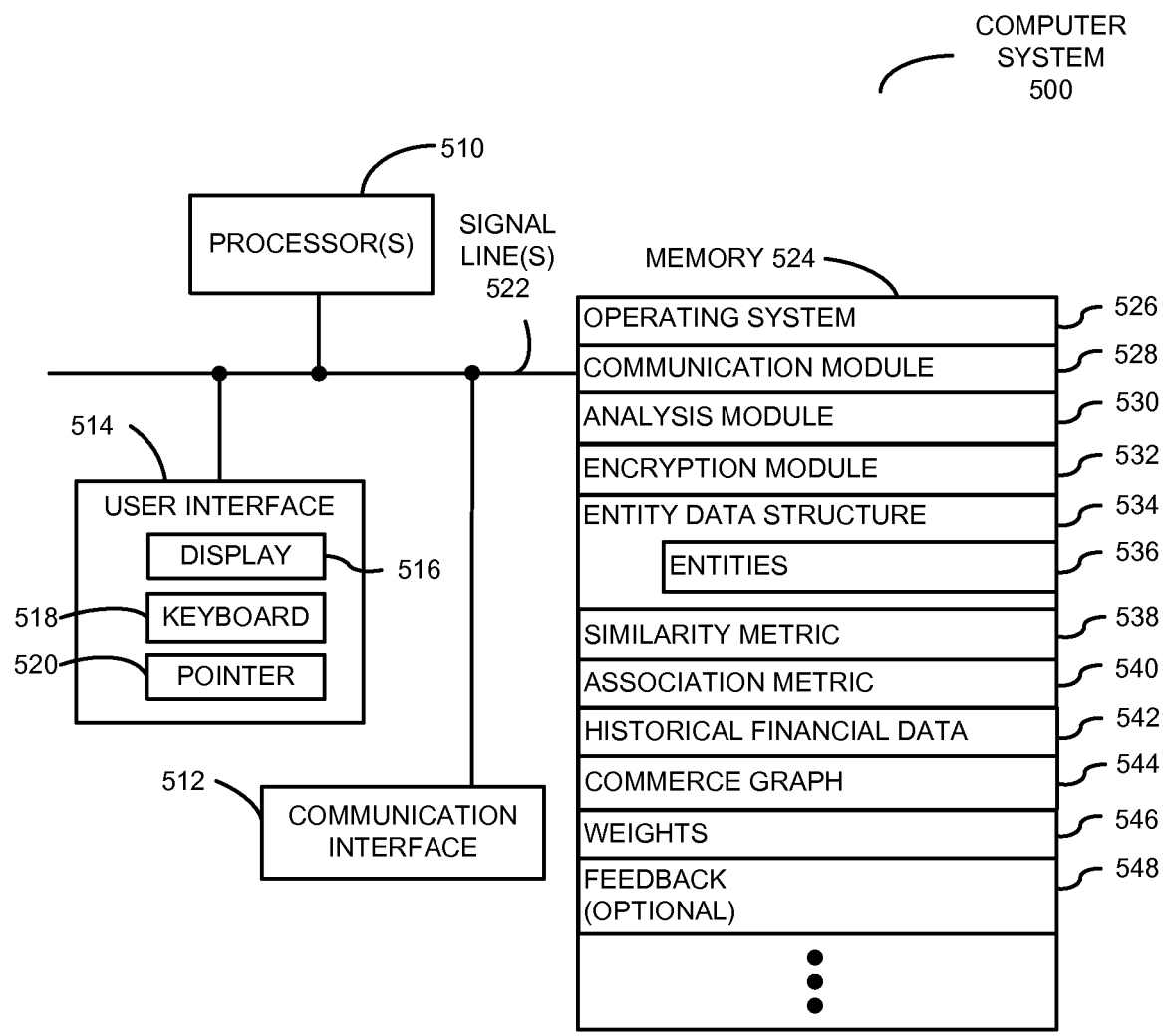
FIG. 5 is a block diagram illustrating a computer system that performs the method of FIGS. 1 and 2 in accordance with an embodiment of the present disclosure.

FIG. 5 presents a block diagram illustrating a computer system 500 that performs method 100 (FIGS. 1 and 2), such as computer 212 (FIGS. 2 and 4). Computer system 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including: analysis module 530 (or a set of instructions) and/or encryption module 532 (or a set of instructions). Note that one or more of these program modules (or sets of instructions) may constitute a computer-program mechanism.

During the analysis technique, analysis module 530 may receive, via communication interface 512 and communication module 528, information specifying one or more entities 536. Alternatively or additionally, analysis module 530 may access information specifying the one or more entities 536 in an entity data structure 534.

Then, analysis module 530 may compare the information specifying two entities to determine similarity metric 538.

Moreover, analysis module 530 may calculate association metric 540 between financial-transaction histories for the two entities based on analysis of entries in historical financial data 542 for the two entities. Note that historical financial data 542 may be represented using a commerce graph 544 and nodes in this commerce graph may have associated weights 546.

Next, analysis module 530 may determine whether the two entities are likely to be a same entity based on similarity metric 538 and association metric 540.

Furthermore, analysis module 530 may perform optional additional actions, such as requesting feedback via communication module 528 and communication interface 512. Using optional feedback 548, analysis module 530 may selectively combine the two entities into the same entity.

Because information used in the analysis technique may be sensitive in nature, in some embodiments at least some of the data stored in memory 524 and/or at least some of the data communicated using communication module 528 is encrypted or decrypted using encryption module 532.

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors 510.

Although computer system 500 is illustrated as having a number of discrete items, FIG. 5 is intended to be a functional description of the various features that may be present in computer system 500 rather than a structural schematic of the embodiments described herein. In some embodiments, some or all of the functionality of computer system 500 may be implemented in one or more application-specific integrated circuits (ASICs) and/or one or more digital signal processors (DSPs).

Computer system 500, as well as electronic devices, computers and servers in system 500, may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, network 412 (FIG. 4) may include: the Internet, World Wide Web (WWW), an intranet, a cellular-telephone network, LAN, WAN, MAN, or a combination of networks, or other technology enabling communication between computing systems.

Electronic device 210 (FIGS. 2 and 4), computer 212 (FIGS. 2 and 4), system 400 (FIG. 4), and/or computer system 500 may include fewer components or additional components. Moreover, two or more components may be combined into a single component, and/or a position of one or more components may be changed. In some embodiments, the functionality of electronic device 210 (FIGS. 2 and 4), computer 212 (FIGS. 2 and 4), system 400 (FIG. 4) and/or computer system 500 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

While a data structure that includes historical financial data was used as an illustration of the analysis technique, in other embodiments the analysis technique may be used with a wide variety of data structures and/or data types, including data structures corresponding to other types of graphs, and data structures that include data other than financial data. Therefore, the interactions among the entities may be non-financial interactions, such as: emails, chat messages, telephone calls, etc.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for disambiguating two entities of a set of entities, the method comprising:
   accessing electronic information specifying the two entities;
   comparing the electronic information to determine a similarity metric;
   determining whether the similarity metric is below a threshold;
   upon determining that the similarity metric is below the threshold:
      calculating an association metric between financial-transaction histories for the two entities based on analysis of entries in a data structure that includes historical financial data for the two entities, wherein;
      the historical financial data for each of the two entities is related to a different account associated with one or more computing applications,
      the data structure represents the historical financial data as a commerce graph with nodes and branches representing financial interrelationships among the set of entities,
      the financial interrelationships include inputs received by the set of entities, outputs provided by the set of entities, and financial transactions among the set of entities,
      the association metric is calculated as a weighted summation of a number of branches from each of the two entities which are connected to nodes commonly associated with both of the two entities,
      the branches have respective weights in the calculation,
      the financial transactions include payments, invoices, estimates and messages among the set of entities,
      the respective weights for payments are larger than the respective weights for the invoices,
      the respective weights for the invoices are larger than the respective weights for the estimates, and
      the respective weights for the estimates are larger than the respective weights for the messages;

normalizing both the similarity metric and the association metric using maximum values to determine a normalized similarity metric and a normalized association metric;
comparing the normalized similarity metric to a similarity threshold;
comparing the normalized association metric to an association threshold;
determining, based on the comparing, whether the two entities are likely to be a same entity; and
providing a targeted advertisement or a targeted promotion to a particular entity of the set of entities based on whether the two entities are likely to be the same entity.

2. The method of claim 1, wherein the comparing involves computing a string distance of the electronic information specifying the two entities.

3. The method of claim 1, wherein the calculating involves comparing the branches from nodes associated with the two entities; and wherein the association metric indicates a stronger association between the entities if patterns of the branches are similar for the nodes.

4. The method of claim 1, wherein the historical financial data for the two entities comprises information relating to business volume and customer loyalty.

5. The method of claim 1, wherein the determining whether the two entities are likely to be the same entity is further based on comparing simplicial complexes associated with the two entities in the commerce graph using persistent homology.

6. The method of claim 1, wherein the entities include individuals, businesses and organizations.

7. The method of claim 1, wherein the computer-implemented method further comprises:
requesting feedback from at least one of the two entities regarding whether the two entities are the same entity if the two entities are likely to be the same entity;
receiving the feedback;
if the feedback indicates that the two entities are the same entity, combining the two entities into the same entity; and
otherwise, keeping the two entities separate.

8. The method of claim 1, wherein the financial transactions were conducted using financial vehicles associated with different financial institutions.

9. A non-transitory computer-readable medium comprising instructions that, when executed by a processor of a computer system, cause the processor to perform a method for disambiguating two entities of a set of entities, the method comprising:
for accessing electronic information specifying the two entities;
comparing the electronic information to determine a similarity metric;
determining whether the similarity metric is below a threshold;
upon determining that the similarity metric is below the threshold:
calculating an association metric between financial-transaction histories for the two entities based on analysis of entries in a data structure that includes historical financial data for the two entities, wherein:
the historical financial data for each of the two entities is related to a different account associated with one or more computing applications,
the data structure represents the historical financial data as a commerce graph with nodes and branches representing financial interrelationships among the set of entities,
the financial interrelationships include inputs received by the set of entities, outputs provided by the set of entities, and financial transactions among the set of entities;
the association metric is calculated as a weighted summation of a number of branches from each of the two entities which are connected to nodes commonly associated with both of the two entities;
the branches have respective weights in the calculation;
the financial transactions include: payments, invoices, estimates and messages among the set of entities;
and the respective weights for payments are larger than the respective weights for the invoices, the respective weights for the invoices are larger than the respective weights for the estimates, and the respective weights for the estimates are larger than the respective weights for the messages;
normalizing both the similarity metric and the association metric using maximum values to determine a normalized similarity metric and a normalized association metric;
comparing the normalized similarity metric to a similarity threshold;
comparing the normalized association metric to an association threshold;
determining, based on the comparing, whether the two entities are likely to be a same entity; and
providing a targeted advertisement or a targeted promotion to a particular entity of the set of entities based on whether the two entities are likely to be the same entity.

10. The non-transitory computer-readable medium of claim 9, wherein the comparing involves computing a string distance of the electronic information specifying the two entities.

11. The non-transitory computer-readable medium of claim 9, wherein the calculating involves comparing the branches from nodes associated with the two entities; and
wherein the association metric indicates a stronger association between the entities if patterns of the branches are similar for the nodes.

12. The non-transitory computer-readable medium of claim 9, wherein the historical financial data for the two entities comprises information relating to business volume and customer loyalty.

13. The non-transitory computer-readable medium of claim 12, wherein the determining whether the two entities are likely to be the same entity is further based on comparing simplicial complexes associated with the two entities in the commerce graph using persistent homology.

14. The non-transitory computer-readable medium of claim 9, wherein the method further comprises:
requesting feedback from at least one of the two entities regarding whether the two entities are the same entity if the two entities are likely to be the same entity;
receiving the feedback;
combining the two entities into the same entity if the feedback indicates that the two entities are the same entity; and
otherwise keeping the two entities separate.

15. A computer system, comprising:
a processor;

memory; and a non transitory computer-readable medium comprising instructions that, when executed by the processor, cause the processor to perform a method for disambiguating two entities of a set of entities, the method comprising:

accessing electronic information specifying the two entities;

comparing the electronic information to determine a similarity metric;

determining whether the similarity metric is below a threshold;

upon determining that the similarity metric is below the threshold:

calculating an association metric between financial-transaction histories for the two entities based on analysis of entries in a data structure that includes historical financial data for the two entities, wherein:

the historical financial data for each of the two entities is related to a different account associated with one or more computing applications;

the data structure represents the historical financial data as a commerce graph with nodes and branches representing financial interrelationships among the set of entities;

the financial interrelationships include inputs received by the set of entities, outputs provided by the set of entities, and financial transactions among the set of entities;

the association metric is calculated as a weighted summation of a number of branches from each of the two entities which are connected to nodes commonly associated with both of the two entities;

the branches have respective weights in the calculation;

the financial transactions include: payments, invoices, estimates and messages among the set of entities; and the respective weights for payments are larger than the respective weights for the invoices, the respective weights for the invoices are larger than the respective weights for the estimates, and the respective weights for the estimates are larger than the respective weights for the messages;

normalizing both the similarity metric and the association metric using maximum values to determine a normalized similarity metric and a normalized association metric;

comparing the normalized similarity metric to a similarity threshold;

comparing the normalized association metric to an association threshold;

determining, based on the comparing, whether the two entities are likely to be a same entity; and providing a targeted advertisement or a targeted promotion to a particular entity of the set of entities based on whether the two entities are likely to be the same entity.

16. The computer system of claim 15, wherein the comparing involves computing a string distance of the electronic information specifying the two entities.

17. The computer system of claim 15, wherein the calculating involves comparing the branches from nodes associated with the two entities; and wherein the association metric indicates a stronger association between the entities if patterns of the branches are similar for the nodes.

18. The computer system of claim 15, wherein the historical financial data for the two entities comprises information relating to business volume and customer loyalty.

19. The computer system of claim 18, wherein the determining whether the two entities are likely to be the same entity is further based on comparing simplicial complexes associated with the two entities in the commerce graph using persistent homology.

20. The computer system of claim 15, wherein the method further comprises:

requesting feedback from at least one of the two entities regarding whether the two entities are the same entity if the two entities are likely to be the same entity;

receiving the feedback;

combining the two entities into the same entity if the feedback indicates that the two entities are the same entity; and otherwise keeping the two entities separate.

* * * * *